UNITED STATES PATENT OFFICE.

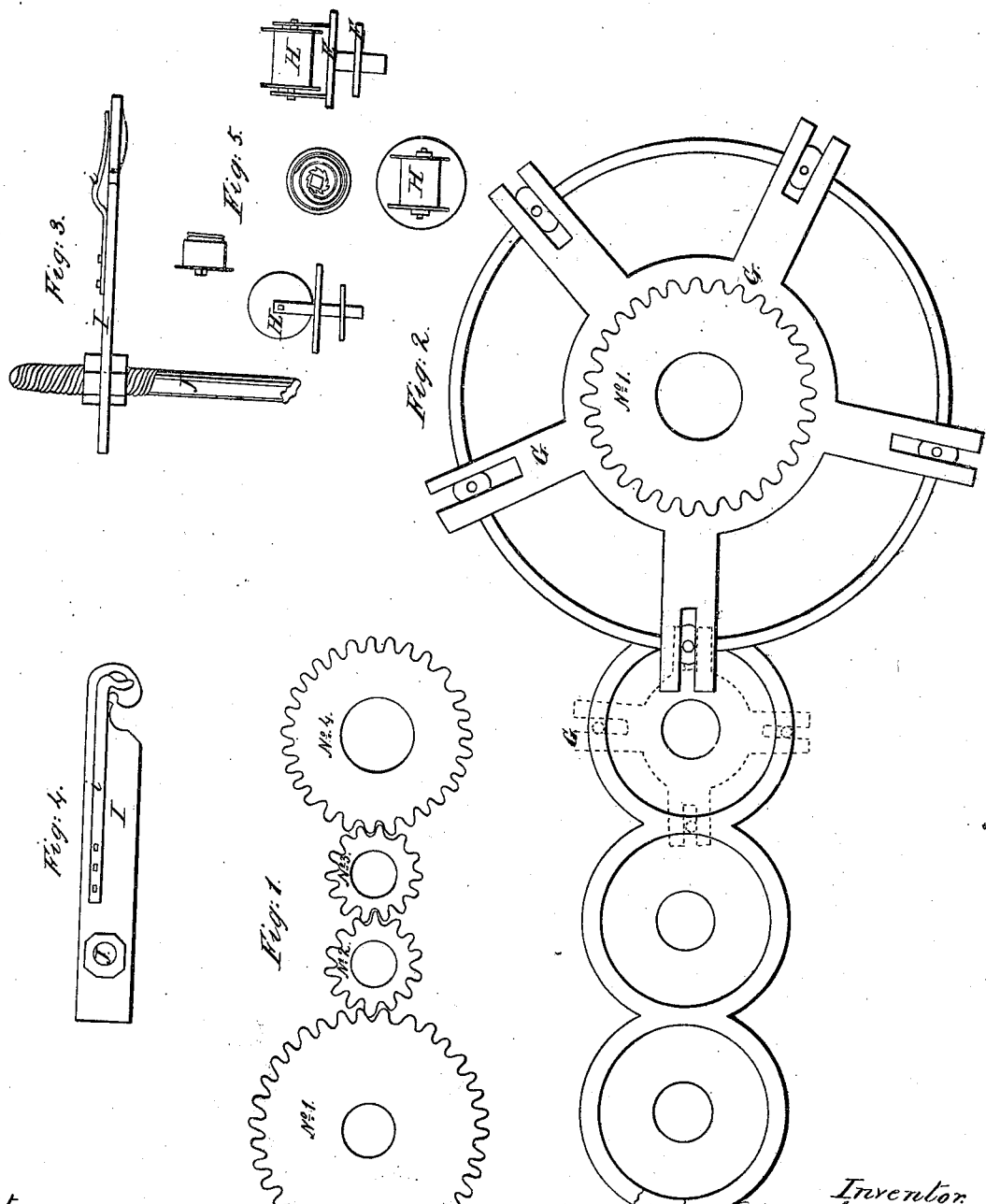

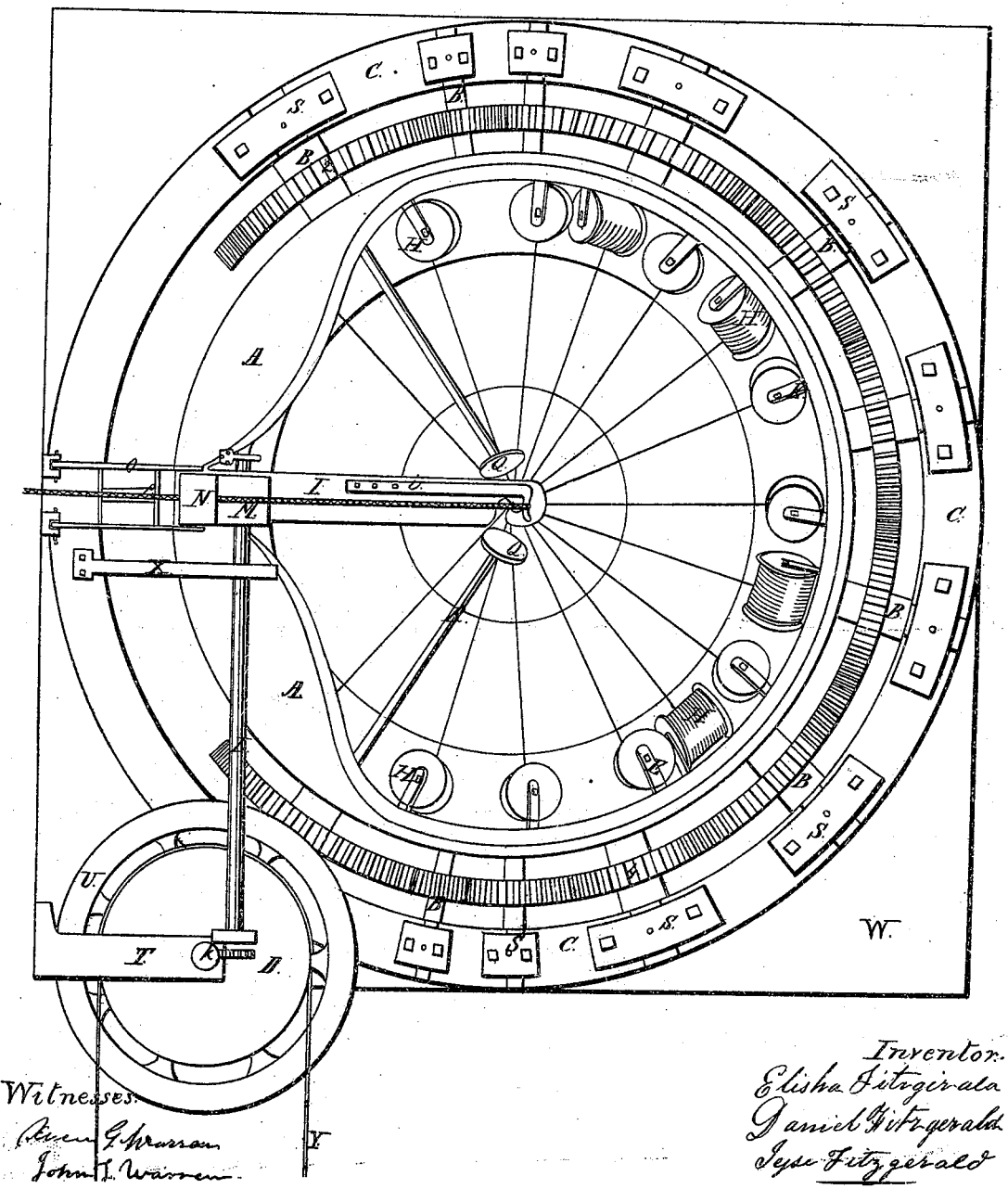

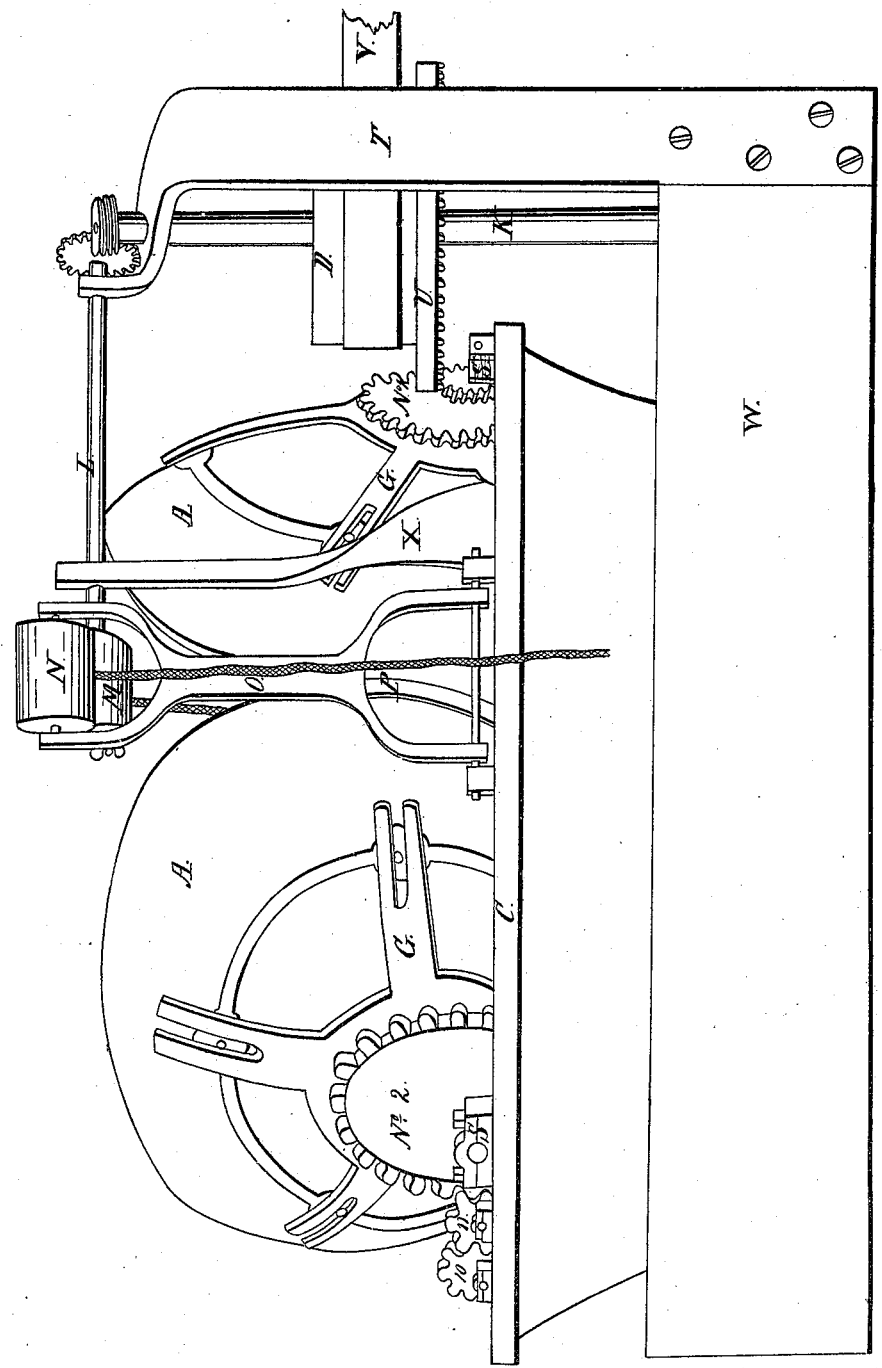

DANIEL FITZGERALD, JESSE FITZGERALD, AND ELISHA FITZGERALD, OF NEW YORK, N. Y.

MACHINE FOR BRAIDING MANILA AND OTHER FIBROUS SUBSTANCES.

Specification of Letters Patent No. 1,566, dated April 24, 1840.

*To all whom it may concern:*

Be it known that we, DANIEL FITZGERALD, JESSE FITZGERALD, and ELISHA FITZGERALD, of the city, county, and State of New York, have invented a new and useful Improvement in Braiding-Machines, by which it is applied to the braiding of Manila or Sisal hemp; and we do hereby declare that the following is a full and exact description.

The nature of the machine consists in causing spools of the fiber attached to "carriers" to traverse a serpentine path two thirds around a "pot" and return, interlacing the fibers so as to produce a braid.

To enable others to make and use our invention we proceed to describe its construction and operation reference being had to the drawings hereunto annexed and making part of this specification.

The size of the whole machine for making ordinary braid is about eighteen inches in diameter and about fifteen inches high. There is a spherical-shaped body called technically the "Pot" (from its resemblance to a cooking utensil,) surrounded by a rim, which supports the machinery. The drawings are made half the size of the ordinary sized machine.

The driving machinery is placed on the outside and the working machinery on the inside of "the pot" (A.) The machinery on the outside consists of ten or twelve (more or less) cog wheels all of which are connected and driven by one of the number. They extend two thirds around the pot.

The cog wheels are hung on spindle, (B) attached to the rim (C.) This is placed at some two inches distance from the pot and the cog wheels are placed within it. These wheels are of three sizes. The wheel No. 1 (so marked in the drawings) is about five inches in diameter. Nos. 2 and 3 and the corresponding ones (10 and 11) are one inch and a half in diameter and serve to connect the wheel No. 1 with No. 4, which last, together with Nos. 5, 6, 7, 8, and 9 is four inches in diameter. No. 12 is the same size as No. 1. On the same shaft with No. 1 is a small cog wheel outside of it, about one inch and a half in diameter with which is connected a bevel driving wheel over which on its upright shaft is the band wheel (D).

There is cut in the pot, two thirds around it, a serpentine path or slot formed by a series of intersecting circles the first and the last of which are larger than the others. The circular pieces which are cut out in making this slot are held in position by the spindle, which run upon one journal each and are set upon the rims C.

The "carriers" (E) are formed each by a circular disk, upon which are two standards holding between them the spool. At the bottom of this disk is the fid, see drawing, Plate IV.

The fid fits into the serpentine slot and is made long enough to pass through half an inch. The carrier being inside and the fid passing through there is a cap (F) placed on the fid outside to hold it in place.

There are "drivers" placed on every spindle outside the pot; they are marked G. On wheels Nos. 1 and 12 they have five arms, each arm having in it a slot made to receive the fid. On the other spindles the drivers have but four arms similarly constructed. The number of drivers correspond with that of the carriers. The machine is made to contain as many of these as there are strands required in the braid. These carriers, by means of their fids connecting with the drivers are made to traverse the serpentine slot backward and forward from end to end. The arm of one driver conveying the carrier over one circle and the arm of the next driver catching the fid in its slot and conveying it under the next circle and so on.

Each spool (H) contains within it a spring to prevent it unwinding too fast.

The "eye-plate" is placed inside the pot near the top, so that the eye will be in the center of the work. The plate is supported by a standard on one side of the pot inside. The eye plate is marked I. The standard is marked J. On the top of the eye-plate there is a spring (*i*).

The shaft of the band wheel (K) has upon its top an endless screw, which works in a small cog wheel upon a horizontal shaft which rests on a part of the same standard that supports the shaft (K) of the band wheel.

The horizontal shaft (L) has upon the other end a roller (M) over which passes the braid. There is another roller (N) under which the braid passes and by which the braid is held and pressed. The roller (N) is on a hinged standard (O) to which is attached a spring (P) for the purpose of pressing it against the braid.

The guides (Q) are on the ends of shafts (R) set in the circular pieces of the larger circles at the end of the serpentine slot. They are either plain disks as shown in the drawing or they may be made as cylinders. They are placed near the "eye" and serve to guide the fibers.

The following is a more minute description by immediate reference to the drawings:

Plate I contains a perspective plan or a view from above the machine, showing the general positions of the parts. Plate II is a side view or elevation, slightly in perspective. Plate III shows the manner in which the serpentine path is made. Figure 1 of this plate shows the connection and relative sizes of the cog wheels on the rim outside the pot. Fig. 2 shows the larger circle of the serpentine slot and smaller ones, with one of the drivers, on the wheel No. 1, and one of the other drivers in occult lines on wheel No. 4. Plate IV shows the spool and the eye-plate. Fig. 3 of this drawing shows the eye-plate and its support. Fig. 4 is the same thing. Fig. 5 the carriers and spools.

The same letter refers to the same things in all the drawings.

A, represents the pot; B, the spindles of the cog wheels; C, the rim out side the pot; D, the drum or band wheel; E, the carrier of the spool; F, the cap outside the pot on the fid; G, the drivers; H, the spools; which are made in two pieces and unscrew in the middle to admit the spring; I, the eye-plate; J, the standard; $i$, the spring over which the braid passes; K, the shaft of the band wheel or drum; L, the horizontal shaft; M, the roller over which the braid passes; N, the roller pressing upon M to hold the braid; O, the hinged standard of the roller N; P, a spring attached to O and pressing against the lower part of the pot A; Q, the guides; R, their shafts; S, the boxes in which run the journals of the spindles of the cog wheels; T, the standard supporting the upright shaft of the band wheel; U, the bevel driving wheel; V, the band upon the drum; W, the platform or bed of the machine; X, support of the horizontal shaft.

In the operation of the machine the spools are filled with the fiber to be braided and the strands passed through the eye. They are then passed over the end of the spring $i$ and then over the roller M and under N. The machine being then put in motion by the band wheel or drum the spools are made to traverse the serpentine slot and the braid is formed.

The spools are restrained from turning too fast by the spring, Pl. 4, inside the spool. This is an ordinary watch spring coiled and put inside the hollow spool on the shaft of which, that is not made to revolve, there is a small ratchet which catches one end of the spring so that the spool will not turn at all till the force upon it is sufficient to overcome the friction of the outer part of the spring against the inside of the spool.

What we claim as our invention and desire to secure by Letters Patent is—

1. The combination of the pressing rollers M and N and with the spools guides Q and eye-plate as herein described.

2. The employment of the guides Q, Pl. I, in the manner and for the purpose described.

Given under our hands this     day of March 1840.

DANIEL FITZGERALD.
JESSE FITZGERALD.
ELISHA FITZGERALD.

Witnesses:
  OWEN G. WARREN,
  ENOS WILDER.